(12) United States Patent
Lazzari et al.

(10) Patent No.: US 9,035,986 B2
(45) Date of Patent: May 19, 2015

(54) METHOD FOR FORMING A COLOUR LASER IMAGE WITH HIGH REFLECTIVE YIELD AND DOCUMENT IN WHICH A COLOUR LASER IMAGE IS THUS PRODUCED

(76) Inventors: Jean Pierre Lazzari, Saint Maxime (FR); Jean Marc Lazzari, Saint Remy l'Honore (FR)

( * ) Notice: Subject to any disclaimer, the term of this patent is extended or adjusted under 35 U.S.C. 154(b) by 0 days.

(21) Appl. No.: 14/001,662

(22) PCT Filed: Feb. 16, 2012

(86) PCT No.: PCT/FR2012/000059
§ 371 (c)(1),
(2), (4) Date: Aug. 26, 2013

(87) PCT Pub. No.: WO2012/117168
PCT Pub. Date: Sep. 7, 2012

(65) Prior Publication Data
US 2013/0328995 A1 Dec. 12, 2013

(30) Foreign Application Priority Data
Feb. 28, 2011 (FR) ..................... 11 00578

(51) Int. Cl.
*G06K 15/12* (2006.01)
*B41M 5/26* (2006.01)
*B41M 5/34* (2006.01)
*B42D 25/41* (2014.01)
*B42D 25/29* (2014.01)
*B42D 25/00* (2014.01)

(52) U.S. Cl.
CPC ............. *G06K 15/129* (2013.01); *B41M 5/267* (2013.01); *B41M 5/34* (2013.01); *B42D 2033/18* (2013.01); *B42D 2033/20* (2013.01); *B42D 2035/24* (2013.01); *B42D 25/41* (2014.10); *B42D 25/29* (2014.10); *B42D 25/00* (2014.10)

(58) Field of Classification Search
CPC ..... G06K 15/129; B41M 5/00; B41M 5/0011
USPC .................................. 347/232, 262
See application file for complete search history.

(56) References Cited

U.S. PATENT DOCUMENTS

| 5,364,829 | A | 11/1994 | Kishimoto et al. |
| 5,932,318 | A | 8/1999 | Uchiyama |
| 6,165,687 | A | 12/2000 | Reele |
| 8,102,115 | B2* | 1/2012 | Kase et al. .................. 313/504 |
| 8,314,828 | B2* | 11/2012 | Bombay et al. ............... 347/262 |
| 2003/0136847 | A1 | 7/2003 | Braun |

FOREIGN PATENT DOCUMENTS

| EP | 1 918 123 | 5/2008 |
| FR | 2 915 614 | 10/2008 |

OTHER PUBLICATIONS

International Search Report dated Apr. 27, 2012 for International Application No. PCT/FR2012/000059 filed Feb. 16, 2012, pp. 1-4.

* cited by examiner

*Primary Examiner* — Sarah Al Hashimi
(74) *Attorney, Agent, or Firm* — MH2 Technology Law Group, LLP

(57) ABSTRACT

A method for forming and a document having a color laser image with high reflective yield, which comprises a sheet of laserable material, sub-pixels in primary colors, the laser beam via carbonization exposing grey levels of the color image, and a substrate. The whole is laminated in various embodiments. The sub-pixels in various embodiments are separated by transparent regions which increase reflectivity and reinforce the white component of the personalised image. Layers of reflective varnish can reinforce reflectivity.

11 Claims, 3 Drawing Sheets

Figure 1:
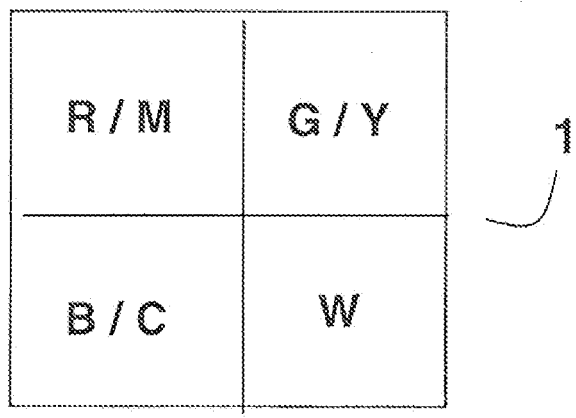

METHOD FOR FORMING A COLOUR LASER IMAGE WITH HIGH REFLECTIVE YIELD AND DOCUMENT IN WHICH A COLOUR LASER IMAGE IS THUS PRODUCED

CROSS-REFERENCE TO RELATED APPLICATIONS

This application is a U.S. National Stage application of International Application No. PCT/FR2012/1000059 filed Feb. 16, 2012, which claims priority to French Application No. 11/00578 filed Feb. 28, 2011, the entire disclosures of which are hereby incorporated by reference in their entireties.

FIELD OF APPLICATION OF THE INVENTION

The present invention concerns the improved reflective yield of colour laser images. It finds particular applications in identity pictures dedicated to official documents: identity cards, credit cards, national health insurance cards, passports, driving licences, secure entry badges, etc.

The primary colours red, green and blue (abbreviated to RGB) are obtained by mixing equal portions of the primary colours yellow, magenta and cyan (abbreviated to (YMC). The printing industry uses the primary colours YMC. These colours are said to be subtractive since if a yellow surface is printed on a sheet of white paper the blue is absorbed and the eye whose rod cells can only distinguish the red, green and blue can only perceive green and red. For a surface with magenta printing, the green is absorbed and the eye perceives red and blue. Finally, for a surface with cyan printing the red is absorbed, and the eye sees green and blue.

The RGB colours therefore contain the YMC colours from which they are derived. These colour triplets, RGB or YMC, are said to be independent since the mixing of two colours of one same triplet cannot form the third colour of this triplet. There are a large number of independent colours and hence a large number of triplets of primary colours.

If small adjacent surfaces are printed, called "sub-pixels" in the remainder hereof and if these surfaces are sufficiently small, the eye can integrate the light beams derived from these three sub-pixels and sees a colour which is the composition of the light beams produced by the reflection of white light on these three sub-pixels. This composition is said to be additive since there is no mixing of colours but mere mixing of coloured light beams derived from the three sub-pixels. The same composition is obtained with any primary colour of sub-pixels, in particular the RGB colours or YMC colours whose colour space is included it that of the RGB triplet. As a result, the additive composition of sub-pixels printed with independent colours is perceived by the eye as being a neutral colour more or less close to white.

For a white colour to be clearly apparent, it is essential that the colours of the sub-pixels should be strongly illuminated. The illumination of these colours sometimes gives rise to major problems which is why some devices reinforce white by adding an additional white colour.

STATE OF THE PRIOR ART

As early as 1950 this notion was introduced, as described in particular in patent GB 646642(A), whereby it is proposed to add a fourth white source W to the three RGB sources of a lighting system.

Since then some LCD screens have added a white sub-pixel to reinforce both luminosity and the white component of images. Patents U.S. Pat. No. 6,453,067 in 2002, KR20040083648, CN101763803 are typical examples thereof chosen from among about 130 patents which exist in this field.

Patent application n° FR 1001415 titled "Device for customizing embedded latent images" filed on 7Apr. 2010, describes a structure comprising a pixel matrix formed of sub-pixels in the primary colours RGB that is embedded underneath a transparent protective layer. Using a laser, grey levels are created in the RGB sub-pixels coated with a black not-reflective surface, through the transparent protective layer. With this treatment it is possible to personalise a colour image of high quality. This personalisation of colour laser images finds applications in particular for identity cards or similar for example.

The image thus personalised is observed by reflection through the transparent protective layer. The personalised image must be sufficiently reflective so that it can be seen in ambient light without having recourse to an additional light source.

To avoid having recourse to this additional light source, it was proposed in the aforementioned patent application to add a white sub-pixel (W) in addition to the three RGB sub-pixels so as to reinforce both the luminosity of the image and its white component. Therefore, it was proposed that the four sub-pixels RGBW should form a square for example. The white sub-pixel therefore overlays one quarter of the surface of the pixel formed of the three RGB sub-pixels and white pixel.

Although advantageous from some viewpoints, this structure of sub-pixels may have some disadvantages. Sub-pixel printing technology is not able to prevent overlapping of the RGBW colours which may generate a grey colour detrimental to the quality of the image. In addition, the print parameters for colours, the quality of the inks used, the reflectivity of these inks mean that a fixed ratio of 25% white W in relation to the size of the pixel is not necessarily a good ratio to generate an image of quality.

With regard to printed documents, other colours have been proposed to print the sub-pixels such as the YMC colours which, as seen above, are the basis of the RGB colours. For example, patent U.S. Pat. No. 7,763,179 proposes sub-pixels in YMC colours covered by a white layer. A laser is used to sublimate the white layer so as to expose the underlying coloured sub-pixels.

The same problems of colour superimposition are found in the method described by this patent. Also, the reflectivity of the colours through openings made in the upper white layer is very weak.

The cited drawbacks occur irrespective of the colour of the sub-pixels: RGB, YMC, or any other colour.

In the remainder hereof the term RGB sub-pixels shall be used for those sub-pixels whose colours meet the definition of independent colours and correspond to the colours detected by the RGB rod cells of the human eye.

DISCLOSURE OF THE INVENTION

It is the objective of the present invention to overcome the drawbacks of the prior art by improving the reflective yield and luminosity of images, For this purpose, the invention proposes particular geometries of the sub-pixels printed by offset or inkjet, or any technique known to persons skilled in the art, on a transparent "laserable" material which also forms the protective layer. In the remainder hereof the term laserable material shall designate any material which darkens under the effect of a laser beam.

More specifically, the subject of the invention is a method for forming a colour laser image with high reflective yield from an assembly comprising a protective layer, pixels formed of sub-pixels printed in primary colours and a substrate. The printing of the sub-pixels is performed by separating the sub-pixels to form a non-printed transparent region between the coloured sub-pixels reinforcing the white component of the personalised image, the protective layer being transparent and in laserable material. The assembly of the protective layer, of the sub-pixels with the transparent region and of the substrate is laminated. The sheet of laserable material is then partly carbonized under the effect of a laser beam to form non-reflective surfaces above the sub-pixels and to produce grey levels of a personalised image.

Laserable materials, as non-limiting examples, are polycarbonates, some treated polyvinyl chlorides, treated acrylonitrile-butadiene-styrenes or treated polyethylene terephthalates. The laserable material is partly carbonized by the laser to form grey levels in a personalised image.

Since the surfaces of the printed sub-pixels are not adjacent one another, they expose non-printed surfaces which, via transparency and reflection on a substantially white reflective layer, increase the luminosity of the laser image.

The extent of darkening is made proportional to the energy deposited by the laser using linearizing software known to the person skilled in the art.

Laser carbonization to expose grey levels is conducted both above the sub-pixels and above the transparent surfaces, "above" meaning closer to the display space. Therefore the contrast, which is the ratio of luminosity between a white image and a black image, is maintained.

The transparent sheet of laserable material may advantageously have a thickness of between 10 μm and 500 μm. The sub-pixels are printed on the sheet of laserable material by offset, inkjet or any other technique. The sub-pixels are organised into parallel columns or into uniformly distributed small surfaces.

At the second production step called "lamination" the sheet of laserable material is hot welded under pressure onto the substrate of the document trapping the matrix of sub-pixels between the sheet of laserable material and the substrate, forming a substantially white background which can be seen between the sub-pixels.

The personalisation of the image subject of the invention is then performed using a laser beam which carbonizes the sheet of laserable material through the thickness thereof as per variable intensities or surfaces, above each sub-pixel or each transparent surface not overlaid by the colours of the sub-pixels, in order to expose the grey levels of the final image. The transparent surfaces between each sub-pixel have a surface determined by the designer of the matrix of sub-pixels, so as to increase reflectivity and reinforce the whites in the personalised image. Ambient light, passing through the transparent laserable sheet and through the transparent surfaces not overlaid by the primary colours, is reflected against a substantially white background of the substrate. The luminosity of the image is thereby improved by enhancing the shades of the white dominants. In addition, these transparent surfaces not overlaid by the primary colours provide a certain margin of error for the positioning of the coloured sub-pixels, and prevent the superimposition of the primary colours.

According to particular embodiments:
the sub-pixels are printed on the sheet of laserable material;
the sub-pixels are printed on the substrate;
reflecting and planarizing means cover the surface of the laserable material facing the sub-pixels, the latter being printed on these means;
the sub-pixel are overlaid with reflecting means before lamination;
reflecting means are deposited on the substrate.

According to one variant of the invention, the sub-pixels in a matrix or in columns are printed on a substantially white substrate and covered with the laserable material.

The invention also concerns a document comprising a laser image formed by implementing the above method. This document comprises a sheet of laserable material acting as protective layer, this sheet being at least partly carbonized by laser radiation, pixels printed between the laserable sheet and a document substrate, these pixels forming an image and comprising sub-pixels organised into surfaces separated by a transparent region. The laserable sheet, the sub-pixels separated by the transparent region and the substrate are able to be laminated together.

According to particular embodiments:
the printing of the sub-pixels is performed on a varnish layer formed between the laserable sheet and the substrate;
a reflective varnish layer is able to overlay the sub-pixels;
the substrate has a substantially white surface facing the sub-pixels;
the RGB sub-pixels are organised in a configuration chosen from among parallel columns separated by columns forming the transparent region, finite geometric shapes distributed in rows and columns and separated by a grid pattern forming the transparent region, and geometric shapes defined per group of sub-pixels and surface adjusted so that the reflected light intensity of each of these groups is identical.

PRESENTATION OF THE FIGURES

Figure 2:
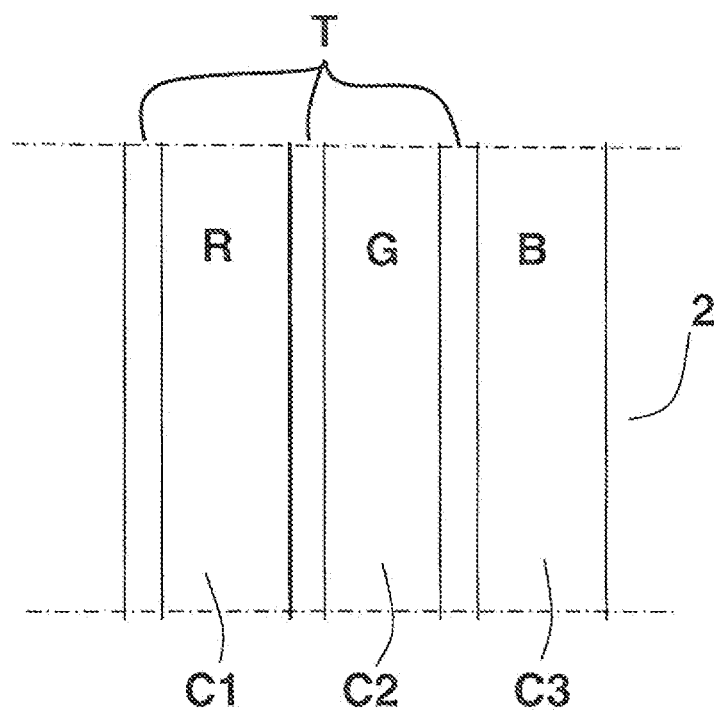
Figure 3:
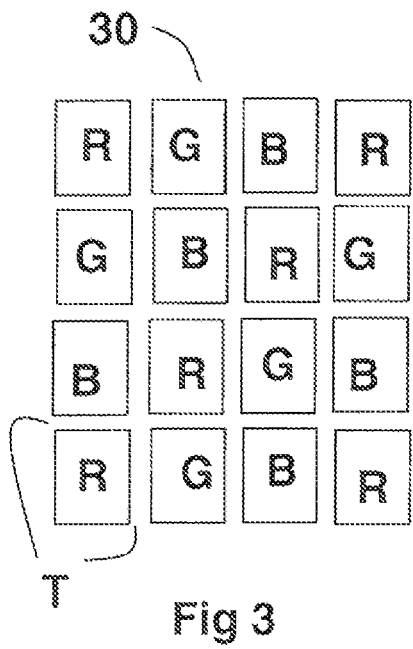
Figure 4:
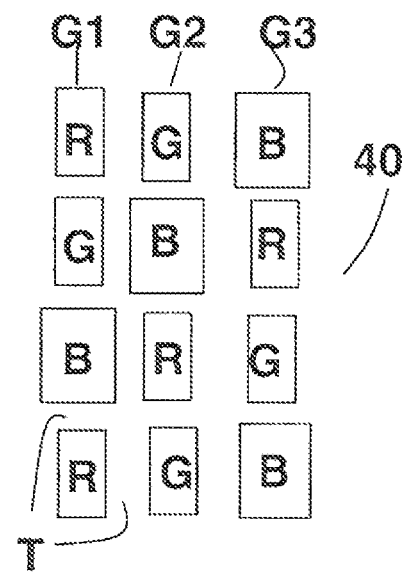
Figure 5:
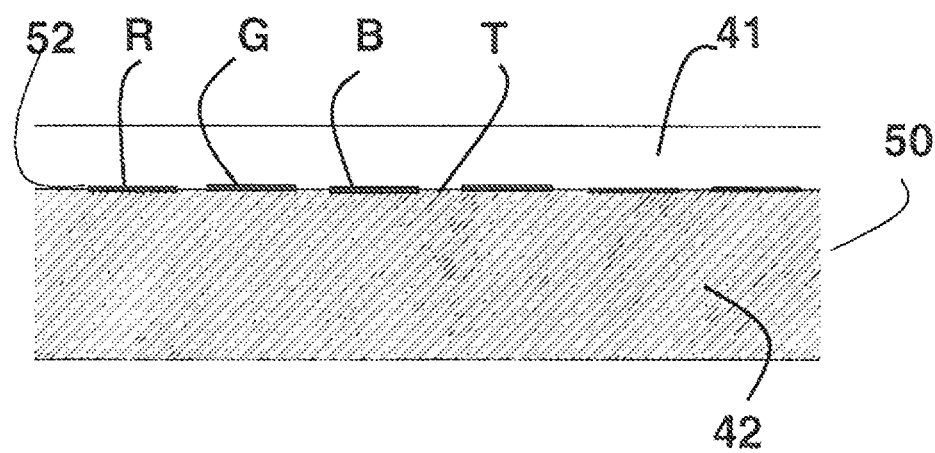
Figure 6:
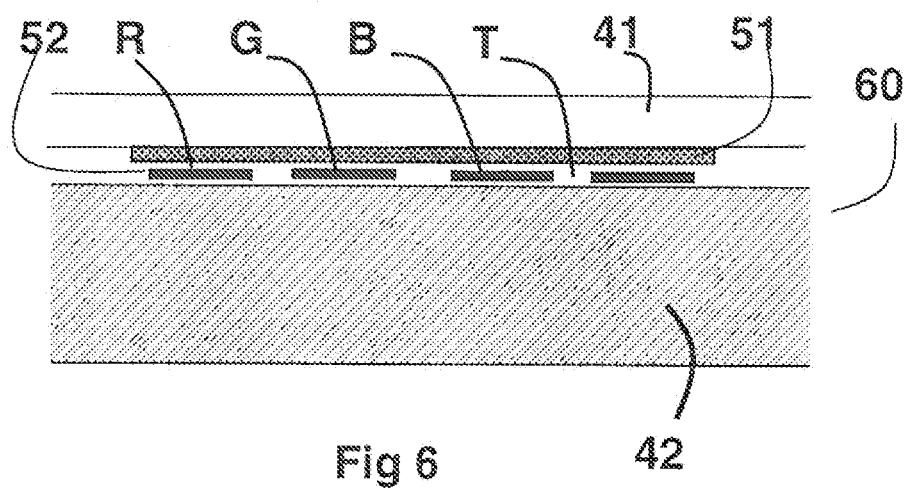
Figure 7:
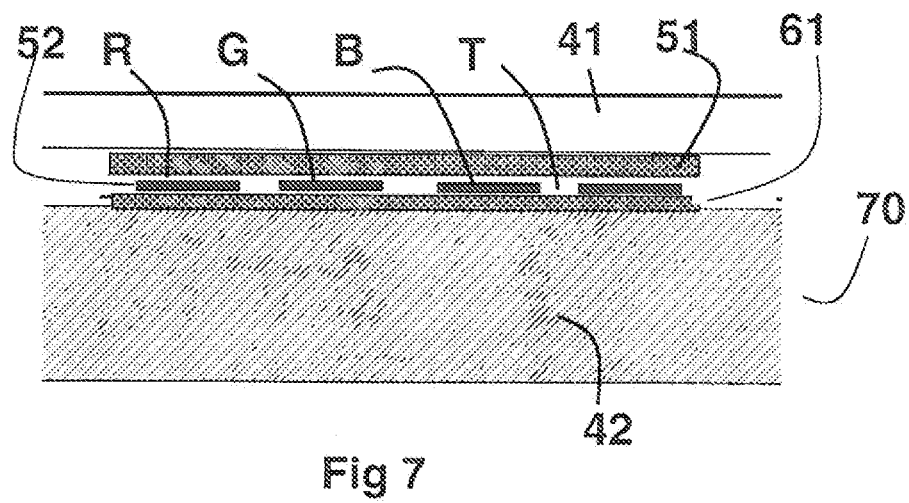

The invention will become better apparent further to the following description given for explanatory purposes and in no way limiting. This description refers to the appended drawings in which:

FIG. 1 gives a front view in the display space of a pixel comprising three sub-pixels R,G,B, and of a fourth white sub-pixel W, according to the prior art;

FIG. 2 gives a front view of a planar RGB pixel formed of three sub-pixels R, G, B, each forming a column, these columns being separated by columns with transparent surfaces;

FIG. 3 gives a front view of RGB pixels formed of rectangular sub-pixels in a regular matrix, the sub-pixels being separated by a grid pattern formed of a transparent surface;

FIG. 4 gives a front view of RGB pixels of the type in FIG. 3 with sub-pixels of different sizes;

FIG. 5 gives a cross-section of the assembly ready for laminating of a sheet at laserable material comprising a printed R, G, B matrix on a card substrate;

FIG. 6 is a cross-sectional view of a variant of embodiment of the assembly in FIG. 5, in which a reflective varnish sub-layer is deposited on the laserable sheet having a surface corresponding to that of the printed R,G,B matrix before printing of the colours of this matrix and lamination;

FIG. 7 gives a cross-section of another variant of embodiment with reference to the assembly in FIG. 6, in which a reflective varnish layer overlays the colour print matrix and before lamination.

DETAILED DESCRIPTION

FIG. 1 shows a pixel 1 according to the prior art described in the above-mentioned patent FR 10 01415. The surfaces of the four RGBW sub-pixels lie adjacent, as in the structure described by patent U.S. Pat. No. 7,769,179 with YMC sub-pixels. The sub-pixels in FIG. 1 are partly overlaid by non-reflective surfaces, via laser carbonization, thereby forming the grey levels of a personalised image. The sub-pixel W is printed in a white colour to improve the rendering of white in the personalised image. It covers a fixed surface area corresponding to 25% of the surface of the sub-pixel.

FIG. 2 gives an example of a structure 2 according to the invention, namely RGB sub-pixels respectively formed of parallel, aligned columns C1,C2,C3 of same width same length in the example, respectively printed in RGB colours on a transparent sheet of laserable material. Alternatively, the matrix may be printed on a card substrate before lamination with the laserable sheet.

The columns C1, C2, C3 are separated by Non-printed regions T i.e. transparent. The laser beam producing the grey levels by carbonizing the transparent laserable sheet to form a personalised image scans the columns C1, C2, C3 lengthwise. The sub-pixels therefore have a width equal to the width of the columns C1, C2, C3, and a variable length depending on the length of laser carbonization reproducing the image to be personalised.

The transparent regions T between each column C1, C2, C3 have a width predefined by the designer of the matrix, to optimise the trade-off between luminosity of the image, which is proportional to the width of the regions T, and loss of colour produced by reducing the width of the printed columns C1, C2, C3. The width of the transparent regions T between two columns C1, C2, C3 may extend between a few percent and 90 percent of the surface of the columns C1, C2, C3.

Laser carbonization within the laserable sheet generates non-reflective surfaces which may partly overlay the columns C1, C2, C3, depending on the desired grey levels. This carbonization may also overlay all or part of the transparent regions T to produce more or less enhanced black shades in the image. The contrast of the final personalised image is therefore very high.

The printing of the colours R,G,B on the sheet of laserable material, or on the card substrate, produces the columns C1, C2, C3 with some uncertainty regarding the precision of the edges of these columns. If there were no transparent regions T then overlapping of colours could occur between two columns which would be detrimental to the quality of the personalised image. The same applies to the precision of laser beam projection which, without these regions T, could darken adjacent sub-pixels thereby modifying the resulting colour of the pixel concerned. The transparent regions T of the invention therefore allow the avoiding of these drawbacks.

FIG. 3 shows an RGB matrix 30 comprising sub-pixels of predefined geometry, which is rectangular in the example in FIG. 3. However, any other regular and predefined geometrical shapes can be used according to the invention, such as square, hexagonal, diamond or circular shapes for example. Contrary to the column structure in FIG. 2, each sub-pixel has a defined surface. Each sub-pixel is separated from its neighbours by a non-printed region i.e. transparent T forming a grid pattern. The width of the transparent regions T of this grid may differ "per column" in the vertical direction FIG. 3 or "per row" in the horizontal direction in this same Figure. This is dependent upon printing precision in the previously indicated directions. The same. criteria regarding the ratio of the surfaces of the transparent regions T and of the coloured regions apply to the structure in FIGS. 2 and 3.

FIG. 4 also shows a set of sub-pixels 40 formed of a matrix of RGB sub-pixels separated by transparent regions T. In this example of embodiment of the invention the dimensions of some groups of sub-pixels are not identical to those of other groups of sub-pixels: the surface of the rectangular sub-pixels B in group G3 for example is larger than the surface of the rectangular sub-pixels R in group G1 and G in group G2. The colour of the sub-pixels is seen via reflection by the observer. The reflective power of the sub-pixels is a function of a large number of parameters: the very nature of the ink used, the roughness of the surface on which the ink is deposited, the surface roughness of the ink itself, etc.

"When the matrix of sub-pixels has not yet been personalised by laser carbonization, it should have a uniform light colour. In reality this is very rarely the case precisely on account of the previously listed parameters. It often appears to have a slightly pink or light blue shade".

According to the invention, the surface of some groups of sub-pixels is advantageously adjusted so that the light intensity reflected by each group of sub-pixels G1, G2, G3 is identical. An example of adjustment is given in FIG. 4 where the sub-pixels B in group G3 have a larger surface area than the red sub-pixels R in group G1 and sub-pixels G in group G2. However, any other combination between these surfaces can be implemented without departing from the scope of the invention.

FIG. 5 is a cross-sectional view of the assembly 50 of a laserable sheet 41 laminated on a card substrate 42. The matrix of RGB sub-pixels 52 and the transparent regions T are formed between the sheet of laserable material 41 the card substrate 42.

A laser beam, via carbonization, generates dark or black zones in the thickness of the transparent sheet of laserable material 41. These zones partly obstruct reflection of ambient light passing through them, and which is reflected either on the surfaces R, G, B or on the surface of the card substrate 42.

FIG. 6 shows a variant 60 of the invention. Before printing the colours R,G,B on the sheet of laserable material 41, a transparent and highly reflective varnish layer 51 is directly deposited on this sheet 41, as a surface corresponding to the surface of the matrix of RGB sub-pixels 52. The matrix 52 of RGB sub-pixels is then printed on the varnish layer 51, the surface of the sub-pixels exposed to the observer thereby becoming very shiny with increased rate of reflectivity.

The varnish 51 is transparent which enables ambient light to pass through it and to be reflected through transparent regions T. The varnish layer 51 forms a planarizing layer. The surface of the sheet of laserable material 41 on which the matrix 52 of RGB sub-pixels is printed may sometimes have roughness which limits the quality of reflectivity of the colours R,G,B. The planarizing varnish surface is very smooth which further promotes the reflectivity of the colours R,G,B.

FIG. 7 shows another variant of the invention with reference to the embodiment illustrated in FIG. 6. In addition to or alternatively according to another variant of the varnish layer 51 in FIG. 6, and after printing of the matrix 52 of RGB sub-pixels on the sheet of laserable material 41, a reflective layer 61 is deposited on the matrix 52 of RGB sub-pixels before the sheet of laserable material is assembled by lamination onto the card substrate 42.

This layer 61 further promotes the reflectivity of ambient light, making the personalised image even more bright and shiny. The layer 61 may be formed of a reflective varnish, a reflective ink or any other reflective surface known to the person skilled in the art, such as aluminium foil for example. According to one alternative of the invention, the layer 61 can be deposited on the card substrate 42. Part of ambient light is reflected on the surface of the colours R,G,B, but another part passes through these colours and is reflected on the layer 61 which increases the reflectivity of the image.

The invention claimed is:

1. A method for forming a colour laser image with high reflective yield from an assembly comprising a protective layer, pixels formed of sub-pixels printed in primary colours, and a substrate, the method comprising:

printing the sub-pixels by separating the sub-pixels to form a transparent, non-printed region between the sub-pixels, thereby reinforcing a white component of the image, the protective layer being transparent and in a sheet of laserable material;

laminating the assembly of the protective layer, the sub-pixels with the transparent region, and the substrate; and exposing the sheet of laserable material to a laser beam, which causes the sheet of laserable material to be partly carbonized, thereby forming non-reflective surfaces above the sub-pixels and producing grey levels in the image.

2. The method for forming a colour laser image according to claim 1, wherein the sub-pixels are printed on the sheet of laserable material.

3. The method for forming a colour laser image according to claim 1, wherein the sub-pixels are printed on the substrate.

4. The method for forming a colour laser image according to claim 1, wherein a first reflective and planarizing layer overlays the surface of the laserable material as a surface corresponding to that of a matrix of the sub-pixels, the latter being printed on the first reflective and planarizing layer.

5. The method for forming a colour laser image according to claim 4, wherein the matrix of the sub-pixels is overlaid with a second reflective layer before lamination.

6. The method for forming a colour laser image according to claim 5, wherein the second reflective layer is deposited on the substrate.

7. A document comprising a colour laser image, comprising:

a sheet of laserable material acting as a protective layer, the sheet being at least partly carbonized by laser radiation, pixels printed between the laserable sheet and a document substrate the pixels forming an image and comprising sub-pixels organised into surfaces separated by a transparent region, wherein the laserable sheet, the sub-pixels separated by the transparent region, and the substrate are able to be laminated together.

8. The document according to claim 7, further comprisong a varnish layer formed on the laserable sheet, wherein the pixels are printed on the varnish layer.

9. The document according to claim 7, further comprising a reflective varnish layer overlaying the sub-pixels.

10. The document according to claim 7, wherein the substrate has a substantially white surface facing the sub-pixels.

11. The document according to claim 7, wherein the sub-pixels are organised in a configuration chosen from among parallel columns separated by columns forming the transparent region, finite geometrical shapes distributed in rows and columns and separated by a grid pattern forming the transparent region, and geometrical shapes defined per group of sub-pixels and surface-adjusted so that the reflected light intensity of each of these groups is substantially identical.

* * * * *